United States Patent
Nguyen et al.

(10) Patent No.: US 10,817,039 B2
(45) Date of Patent: Oct. 27, 2020

(54) ADJUSTING A POWER LIMIT IN RESPONSE TO A TEMPERATURE DIFFERENCE

(71) Applicant: HEWLETT PACKARD ENTERPRISE DEVELOPMENT LP, Houston, TX (US)

(72) Inventors: Vincent Nguyen, Houston, TX (US); Robert E. Van Cleve, Houston, TX (US); Pranay Mahendra, Cypress, TX (US); Arthur Volkmann, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 119 days.

(21) Appl. No.: 16/118,790

(22) Filed: Aug. 31, 2018

(65) Prior Publication Data
US 2020/0073456 A1    Mar. 5, 2020

(51) Int. Cl.
| | | |
|---|---|---|
| G06F 1/00 | (2006.01) | |
| G06F 11/30 | (2006.01) | |
| G06F 1/28 | (2006.01) | |
| G01K 3/00 | (2006.01) | |
| G06F 1/20 | (2006.01) | |

(52) U.S. Cl.
CPC .............. *G06F 1/28* (2013.01); *G01K 3/005* (2013.01); *G06F 1/206* (2013.01); *G06F 1/203* (2013.01)

(58) Field of Classification Search
CPC ........................................................ G06F 1/28
See application file for complete search history.

(56) References Cited

U.S. PATENT DOCUMENTS

| | | | |
|---|---|---|---|
| 7,036,030 B1* | 4/2006 | Altmejd | G06F 1/3228 |
| | | | 713/322 |
| 8,786,449 B1 | 7/2014 | Kraipak et al. | |
| 8,970,234 B2 | 3/2015 | Takayanagi et al. | |
| 9,360,907 B2 | 6/2016 | Doshi et al. | |
| 9,582,012 B2 | 2/2017 | Park et al. | |
| 2012/0257648 A1* | 10/2012 | Jeong | G01K 7/00 |
| | | | 374/163 |
| 2013/0223155 A1* | 8/2013 | Oowada | G11C 11/5642 |
| | | | 365/185.22 |
| 2016/0147280 A1 | 5/2016 | Thomas et al. | |
| 2016/0327421 A1* | 11/2016 | Schonstein | G01F 25/0007 |

OTHER PUBLICATIONS

Phillip Jones, "A Performance Model for a Thermally Adaptive Application Implemented in Reconfigurable HW," 2006, pp. 1-17 [online], Retrieved from the Internet on Jan. 10, 2018 at URL: <cse.wustl.edu/~jain/cse567-06/ftp/thermal/index.html>.

* cited by examiner

*Primary Examiner* — Mohammed H Rehman
(74) *Attorney, Agent, or Firm* — Hewlett Packard Enterprise Patent Department

(57) ABSTRACT

Examples herein relate to an adjustment of a power limit of a processor. Examples disclose setting the power limit of the processor. The examples also obtaining a temperature difference between a die temperature of a core within the processor and a throttle temperature. In response to a determination that the temperature difference is at most equal to a temperature activation point, adjusting the power limit of the processor so that the adjust power limit is less than the set power limit.

18 Claims, 6 Drawing Sheets

ADJUSTING A POWER LIMIT IN RESPONSE TO A TEMPERATURE DIFFERENCE

BACKGROUND

The American Society of Heating, Refrigerating, and Air Conditioning Engineers (ASHRAE) publishes many different standards over the thermal design and maintenance as related to data centers. For example, ASHRAE 2 and 3 are the standards which provide guidelines over the thermal design of processors within the servers and/or data centers.

BRIEF DESCRIPTION OF THE DRAWINGS

In the accompanying drawings, like numerals refer to like components or blocks. Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
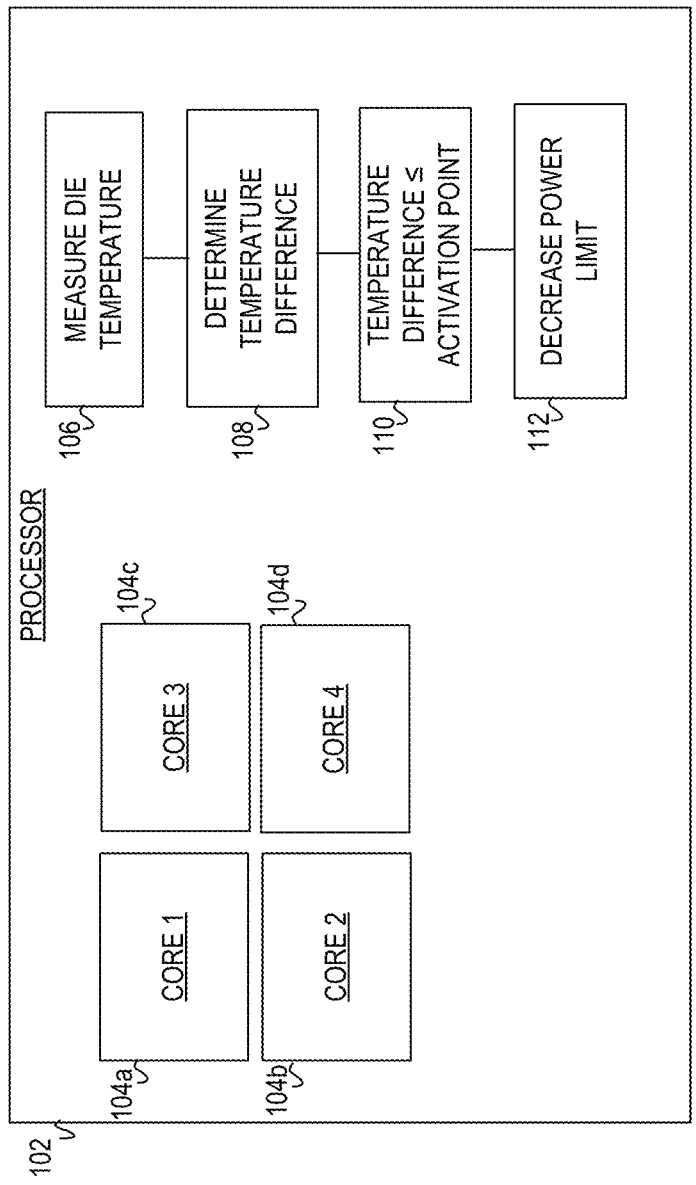
FIG. 1 illustrates an example processor with multiple cores that decreases a power limit in response to a temperature difference being at most equal to a temperature activation point in accordance with the present disclosure.

As global demand for data exchange grows so does the size and load placed on data centers and/or servers. Data centers and/or servers may also be referred to as computing systems throughout the document. These computing systems generate exponentially more power thus producing more heat. As these computing systems generate more heat, efficiently cooling the electrical components within these systems has become a concern. The ASHRAE thermal management specification is defined as to optimize processor performance as the size and/or load increases within these computing systems. The ASHRAE thermal management specification may be restrictive and inhibits servers from supporting a high number of cores and/or high frequency processors within the classification environments.

Additionally, each processor includes design limits that specify power limits, core die temperature, case temperature, etc. As such, heatsinks, fans, baffles, and other hardware components are designed to ensure that the processor operates within these power and temperature specifications.

The server temperature and power limits are conservative and may not reflect the varying dynamics of a typical server workload or operating environment. As such, using conservative empirical data to set the design limits may not be best practice and can limit the number of server deployments within the data center. Additionally, the computing system may become inefficient. For example, a thermal design power (TDP) which is also referred to as the thermal design point is the maximum amount of heat generated by the processor that the cooling system is designed to dissipate under any workload which can limit the number of processor cores and varying workload dynamics.

Further, the processor may including a stock keeping unit (SKU) or other identifying information unique to that processor that may vary from processor to processor. This variable information may include the power limits of the processor and/or thermal temperatures. In this manner, it becomes challenging to create a solution for managing die temperature(s) for all processors.

Solutions to this approach may include a server throttling power on a load when the temperature increases to a set-point temperature. Based on a decrease of the temperature to an acceptable operating temperature, the power may then increase to adequately supply the load. Throttling the server when the temperature reaches the set-point may degrade the overall die within the server over time. Further, throttling the server does not take into account the dynamic nature of the data center load and as such is an efficient approach.

In another approach, thermal temperatures are managed per core within a processor which provides a granular type approach to service portable devices. However, this solution would cause much latency within a larger scale system such as a server and/or data center.

Yet in a further approach, a thermal management core monitors temperatures by a sensor located near a processor core die. Based on changes to the temperatures near the process core die, the thermal management core controls the functionality so that the process will have lower functionality at higher temperatures. This approach is limited to portable systems and not directed to the larger scale systems. Additionally, the approach does not considered the variable workload which can be typical of the larger scale systems. As such, there is no dynamic power modification to accommodate the variable workloads.

The present disclosure provides a processor adaptive thermal management that extends server supporting configurations within the ASHRAE A2-A4 environment. The disclosure provides a mechanism that dynamically adjusts the processor power limit to ensure a processor thermal envelop is within specifications.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible, and indeed desirable as the ability to handle model complexity that evolves with time is another one of the advantages of the disclosure. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "multiple," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for effectively adjusting a processor's power limits in a computing environment. The disclosed examples may include systems, devices, computer-readable storage media, and methods for the power limit adjustment. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

FIG. 1 illustrates an example processor 102 including cores 104a-104d. At modules 106-112, processor 102 measures a die temperature of one of cores 104a-104d, determines a temperature difference between the measured die temperature and a throttle point temperature, compare the difference to a temperature activation point, and adjust a power limit of processor 102. Specifically at modules 110-112, processor 102 identifies that the temperature difference is at most equal to the temperature activation point and decreases the power limit, accordingly. Alternatively, processor 102 identifies that the temperature difference is equal to or less than the temperature activation point prior to decreasing the power limit. FIG. 1 represents a computing system that may utilize processor 102 and multiple cores 104a-104d to provide an adaptive thermal management as provided at modules 108-112. For example, FIG. 1 represents the computing environment that is an ASHRAE compliant environment. As such, FIG. 1 may include additional components not illustrated, such as a memory, storage, additional processor, fan, etc. This will be explained in detail in later figures.

Processor 102 includes cores 104a-104d to adjust the processor power limit in response to the temperature difference being at most equal to the temperature activation point as at modules 106-108. As such, processor 102 may be considered a multi-core circuit, multi-core processor, multi-core circuit, multi-core controller, or other type of processing unit including cores 104a-104d. Implementations of processor 102 may include a virtual device, or physical device such as electronic circuitry (i.e., hardware) that includes an integrated circuit, programmable circuit, application integrated circuit (ASIC), controller, processor, semiconductor, processing resource, chipset, silicon, or other type of component that includes cores 104a-104d to adjust power limits based on temperature measurements.

Processor 102 may be considered an electrical circuit with cores 104a-104d that read, write, and execute data obtained from storage, e.g., cache (not illustrated), within processor 102. The data may include instructions and/or commands for cores 104a-104 to perform an operation(s) to complete a task. Cores 104a-104d may be located within processor and improve processing time of the task such that processor 102 may be able to handle more complex tasks. Cores 104a-104d are considered the brains of processor 102 as instructions and/or code may be executed by any one or combination of cores 104a-104d. Additionally, although FIG. 1 illustrates processor 102 as including four cores 104a-104d, embodiments should not be limited as this was done for illustration purposes. For example, processor 102 may include less four cores, such as two cores or more than four cores, such as six cores, etc. In another implementation, core 104a may be considered a primary core to read, write, and execute data from cache while core 104b-10d may be considered a secondary core, tertiary core, and quaternary core, respectively. Implementations of cores 104a-104 include, by way of example, an execution unit, processing unit, processing node, executing node, or other type of unit capable of performing an operation by reading, writing, and/or executing data with processor 102.

Modules 106-112, based on execution by processor 102 and/or cores 104a-104d, measure the die temperature of one of cores 104a-104d and adjusts the power limit of processor 102, accordingly. Implementations of modules 106-112 include may include, by way of example, instructions (e.g., stored on a machine-readable medium) that, when executed (e.g., by processor 102), implements the functionality of modules 106-112. Alternatively, or in addition, modules 106-112 may include electronic circuitry (i.e., hardware) that implements the corresponding functionality. Additionally, although FIG. 1 illustrates modules 106-112 as separate from cores 104a-104d, this was done for illustration purposes as modules 106-112 may be instructions stored in a cache and executed by cores 104a-104d.

Module 106 includes measuring the die temperature of at least one of cores 104a-104d. The die temperature is a value representative of the temperature of a substrate internal to one of cores 104a-104d. Die is an area of semiconducting material on which processor 102 and/or cores 104a-104d is fabricated. The die may include substrate, circuit board, wafer, silicon, or other type on which cores 104a-104d are fabricated. As such, the die material includes that material that was used to fabricate cores 104a-104d. In this implementation, there may be a sensor (not illustrated) located adjacently to the measurement point in which to acquire the temperature. In another implementation, the sensor may also be coupled to an application programming interface (API) that allows the sensor to transmit the die temperature measurement to processor 102. Based on receiving the die temperature measurement, processor may proceed to module 108.

Module 108 determines the temperature difference between the measured die temperature at module 106 and a throttle temperature. Based on a heavy workload by processor 102, much heat can be generated. Thus, when the cooling systems can no longer dissipate heat fast enough to keep processor 102 and/or core temperatures 104a-104d within a safe range, processor 102 begins to halt tasks. For example, cores 104a-104d and memory frequencies may decrease until temperatures are in the safe operating range. Unmanaged, thermal throttling can have an impact on processor 102 performance as the heat caused by heavy workloads can damage the cores 104a-104d and/or die. The throttle temperature is the temperature value at which the cooling system (e.g., fans, etc.) can no longer dissipate heat fast enough and processor 102. The throttle temperature is the temperature at which the processor 102 interrupts tasks and/or functionalities to bring temperatures back within the safe range. The temperature difference is a value, obtained by processor 102, to compare against the temperature activation point by module 110.

Module 110 compares the temperature difference to the activation point. In response to the temperature difference being at most equal to the activation point, processor 102 decreases the power limit at module 112. Module 110 represents an initial phase of thermal adaptive management. Meaning, based on the temperature difference reaching a particular point (e.g., equal to or less than the activation point), processor 102 adjusts the power limit, accordingly. The activation point is set at a value that is between a throttle point and a fan speed control point. The activation point serves as a trigger to identify when to initiate thermal adaptive management based on the temperature difference.

Figure 2:
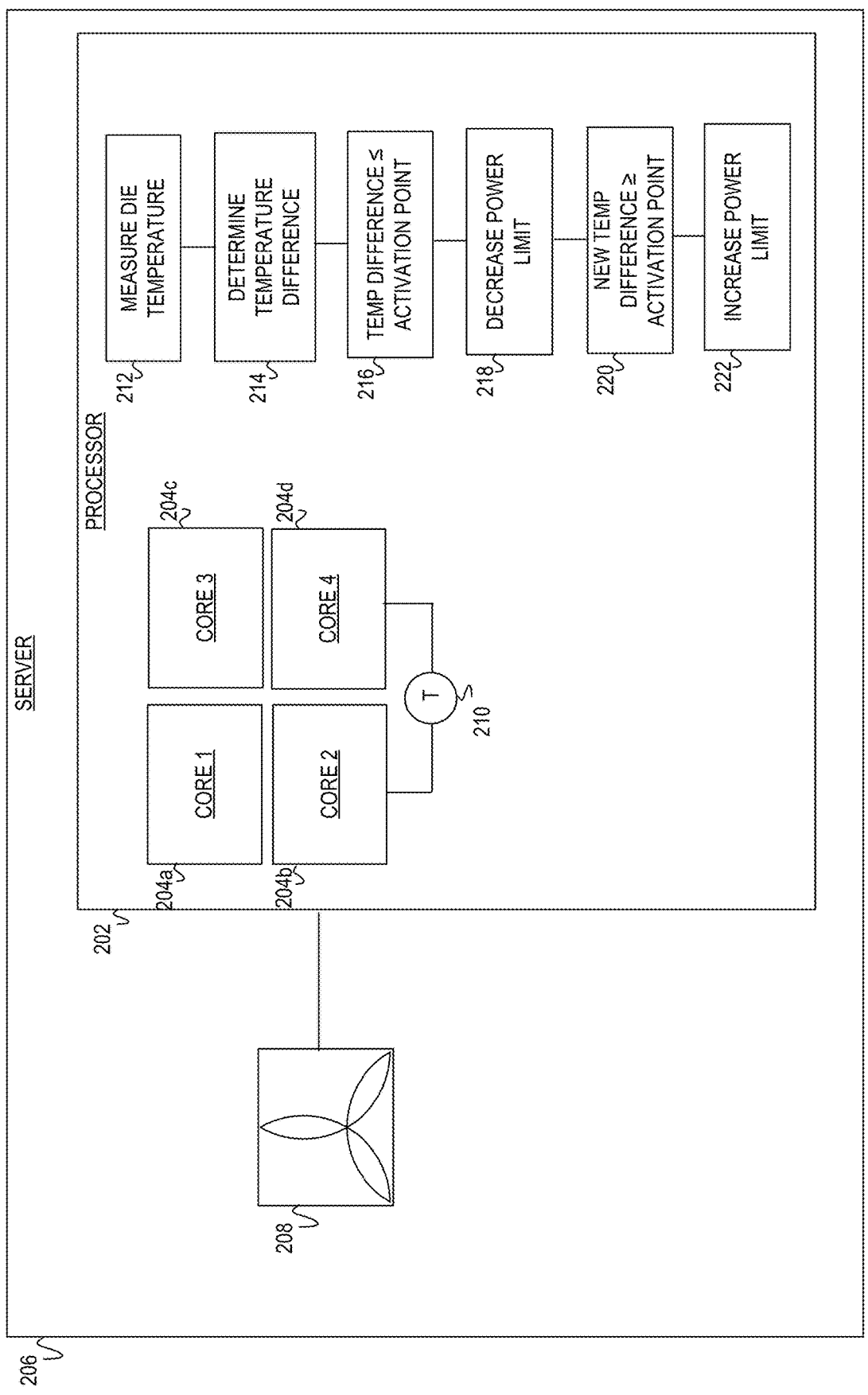
FIG. 2 illustrates an example server system including a fan coupled to a processor with multiple cores to adjust a power limit in response to a measurement of a temperature difference against an activation point in accordance with the present disclosure.

FIG. 2 represents processor 202 with cores 204a-204d, coupled to fan 208, as part of server 202. Processor 202 measures a die temperature of one or more cores 204a-204d by sensor 210. Processor 202 determines the die temperature as measured by sensor 210 at module 212. Using the die temperature, processor 202 determines a temperature difference and measures the temperature difference against an activation point at modules 214-216. In response to the temperature difference being at most equal to the activation point, processor 202 adjusts the power limit by decreasing the power limit at module 218. At modules 220-222, based on a more recent die temperature, processor 202 determines a new temperature difference. In response to the new temperature difference being equal to or greater than the activation point, processor 202 increases the power limit as at module 222. Server 206 represents a partially configured system that includes fan 208 and processor 202. As such, implementations of server 206 may include a database server, mail server, file server, domain name system (DNS) server, print server, web server, game server, application server, telecommunications server, cartridge server, blade server, catalog server, communication server, home server, media server, proxy server, or other type of computing device capable of data exchange. Additionally, although FIG. 2 illustrate processor 202 and fan 208, implementations should not be limited as this was done for illustration purposes. For example, server 206 may also include other components, such as memory modules, circuit boards, among other components that provide the capabilities for server 206 to transmit and receive data.

Processor 202, is coupled to fan 208, and includes 204a-204d that represent a multi-core circuit. As such, each core 204a-204 includes substrate material that represents a die of each core. Sensor 210 may measure the temperature of the die of one more cores 204a-204d. The value of the temperature as measured by sensor 210 may be obtained by processor 202 at module 212 to proceed to determine the temperature difference. Processor 202 and cores 204a-204d may be similar in functionality and structure to processor 102 and cores 104a-104d. Sensor 210 represents a measurement take from the substrate (e.g., die) of at least one of cores 204a-204d. As such, sensor 210 is a device to obtain the temperature measurement which is used at module 212.

Implementations of sensor 210 include, by way of example, a thermocouple, resistance thermometer, nanosensor, mechanical device, electrical device or other device that measure temperature through an electrical signal.

Fan 208, represents a cooling apparatus that creates an airflow to direct over various components, such as processor 202, within server 206. Fan 208 may operate in response to temperatures internal to server 206 reaching a threshold. Sensor 210 continually monitors the temperatures of cores 204a-204d to measure the die temperature, determine a temperature difference, and compare to the activation point as at modules 214-216. Assuming internal temperatures do not continue to rise, fan 206 may be adequate to maintain or cool the server environment. However, fan 208 may not be adequate to cool processor 202 and components if the temperature(s) of cores 204a-204d continue to rise. In this case, once the temperature difference is at most equal to the activation point as at module 216, processor 202 may adjust the power limits to respond to this situation. Fan 208, is a cooling device, designed to create an airflow across processor 202.

Modules 212-222 may determine to adjust the power limits of processor 202 in response to a comparison of the temperature difference against the activation point. The process of modules 212-222 including the activation point and temperature difference represents the power adaptive thermal management and is explained in detail in later figures. Implementations of modules 212-222 include may include, by way of example, instructions (e.g., stored on a machine-readable medium) that, when executed (e.g., by processor 202), implements the functionality of modules 212-222. Alternatively, or in addition, modules 212-222 may include electronic circuitry (i.e., hardware) that implements the corresponding functionality. Additionally, although FIG. 2 illustrates modules 212-222 as separate from cores 204a-204d, this was done for illustration purposes as modules 212-222 may be instructions stored in a cache and executed by cores 204a-204d.

Figure 3:
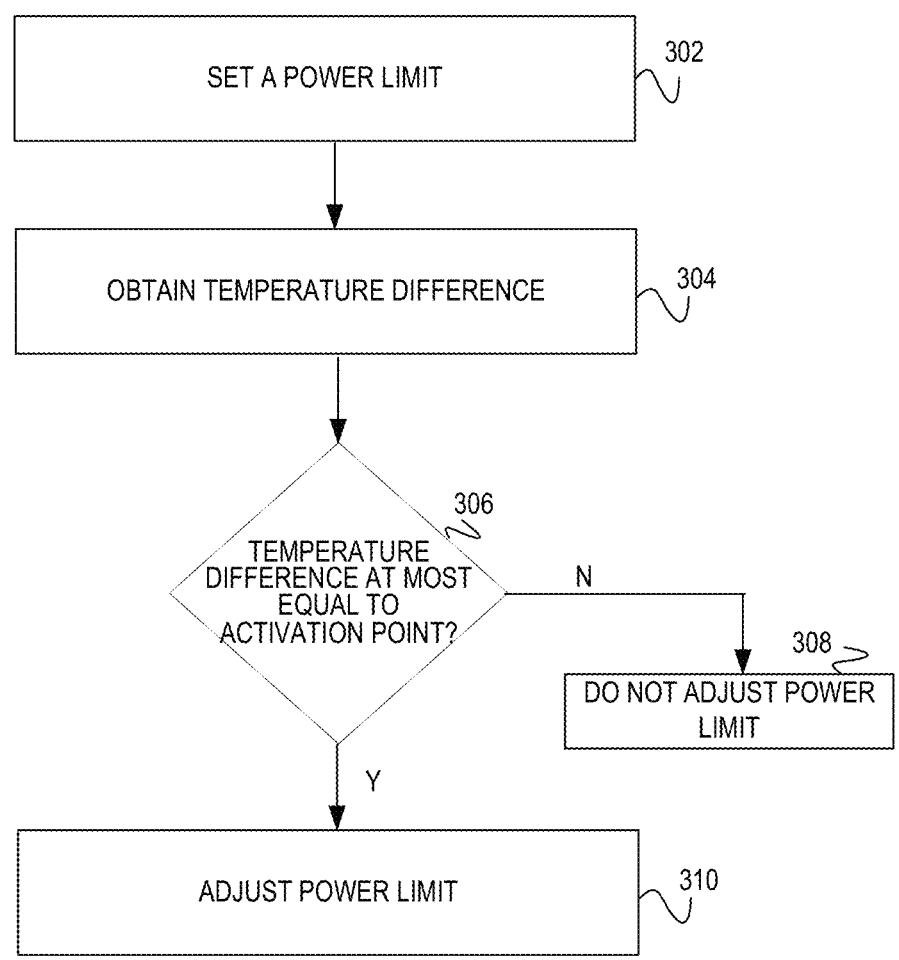
FIG. 3 illustrates a flow diagram executable by a processor to obtain a temperature difference and adjust a power limit in accordance with the present disclosure.
Figure 4:
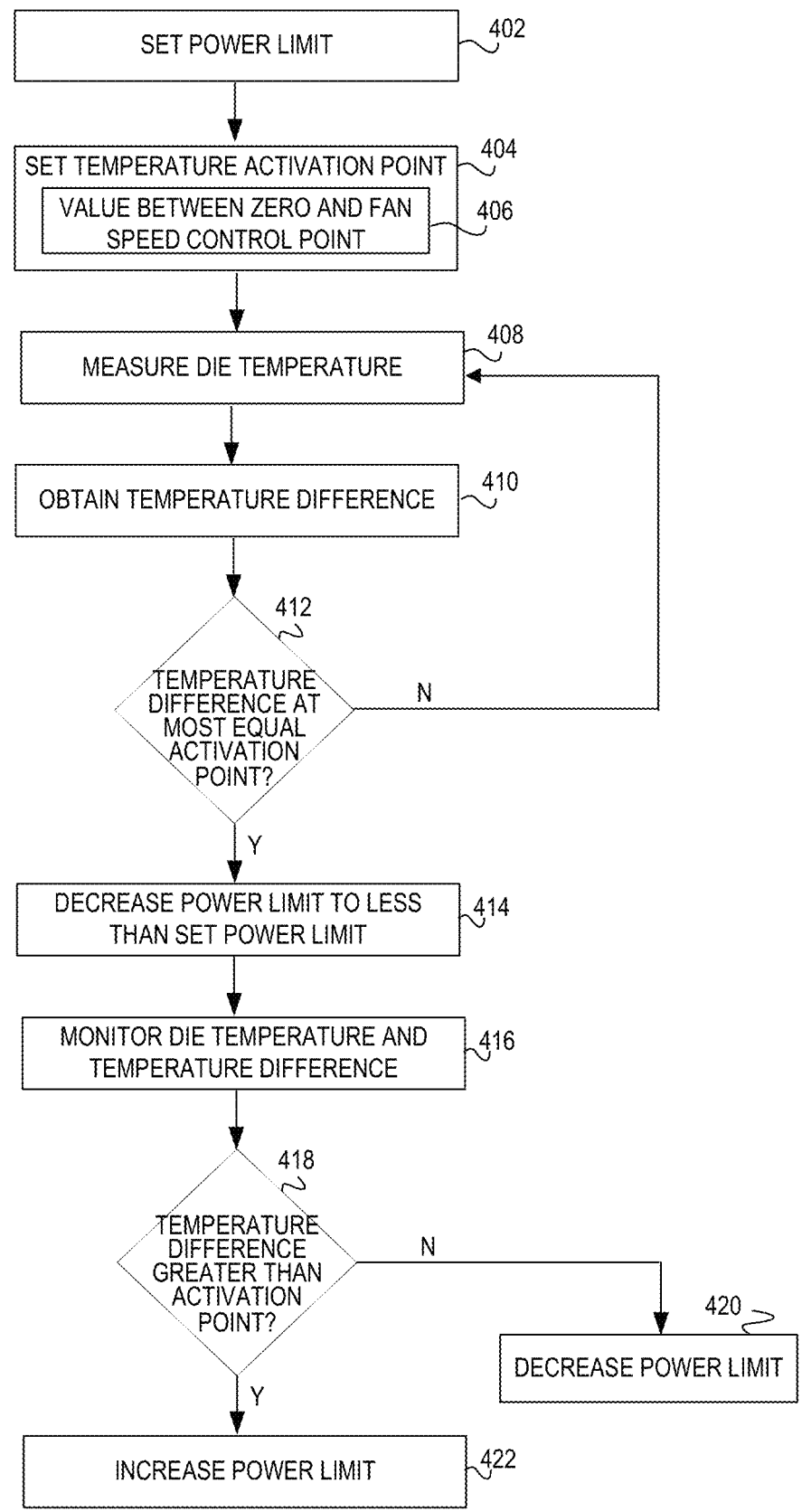
FIG. 4 illustrates a flow diagram executable by a processor to dynamically adjust a power limit of the processor in accordance with the present disclosure.

Referring now to FIGS. 3 and 4, flow diagrams are illustrated in accordance with various examples of the present disclosure. The flow diagrams represent processes that may be utilized in conjunction with various systems and devices as discussed with reference to the preceding figures. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 3-4 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 3 illustrates a flow diagram executable by processor to adjust a power limit in response to a temperature difference being at most equal to a temperature activation point. In discussing FIG. 3, references may be made to the components in FIGS. 1-2 to provide contextual examples. In one implementation, processor 102 and 202 executes operations 302-310 to adjust the power limit. In another implementation, a processing resource (not illustrated) executes operations 302-310. Although FIG. 3 is described as implemented by the processor 102 and 202 as in FIGS. 1-2 to adjust the processor power limit, it may be executable on other suitable hardware components. For example, FIG. 3 may be implemented in the form of executable instructions on a machine-readable storage medium executable by processing resources to provide the functionality of operations 302-310.

At operation 302, the processor sets a power limit that identifies a power threshold that if the outputs a load above this power threshold, the processor may be throttled. In one implementation, the power limit is set below the design-rated power limit that may be identified by a manufacturer of the component. Setting the power limit enables a system to accommodate many different processors that may have varying design requirements and power limits. In another implementation, the power limit may be identified, so when temperatures increase and decrease, the power limit can be adjusted accordingly. Adjusting the power limit in response to the temperature difference enables the processor to enter a thermal adaptive management.

At operation 304, the processor obtain a temperature difference between a die temperature of a core within the processor and a throttle temperature. This may include measuring and monitoring the die temperatures of the core within the processor. The throttle temperature is identified as a set temperature in which the processor is throttled based on reaching the throttle temperature. In this operation, the processor may determine the difference between the die temperature and the throttle temperature which is considered a thermal envelope to ensure the processor is operating within a certain range prior throttling the processor. Determining the temperature difference prevents the throttling of the processor which can lead to breakdown of the die and other components. As such, the current die temperature may be measured and continuously monitored, while the throttle temperature may be a pre-determined value that indicates at which temperature to throttle the operations of the processor. Obtaining the temperature difference may include calculating and/or determining the value between the current die temperature and the throttle temperature. Based on obtaining the temperature difference, the processor determines if this value is at most equal to an activation point at operation 306.

At operation 306, the processor obtains the temperature difference between the current die temperature obtained at operation 304 and the throttle temperature. The current die temperature may be measured at operation 304, while the throttle temperature may be a pre-determined value that indicates at which temperature to throttle the operations of the processor. Obtaining the temperature difference may include calculating and/or determining the value between the current die temperature and the throttle temperature. Based on obtaining the temperature difference, the processor may enter the adaptive thermal management process as at operation 310 or may continue monitoring the die temperature as at operation 308.

At operation 308 in response to the temperature difference being greater than the activation point, the processor does not adjust the power limit. This means, that the processor is not initiating the adaptive thermal management to adjust power limits based on the temperature difference. The processor may continue monitoring and measuring the die temperature to obtain new temperature differences. Continuing to monitor the die temperature, the processor may determine when to initiate the thermal adaptive management point as at operation 310. In this sense, the processor is in a hold pattern that continuously polls the temperature of the die and measures against the throttle point to identify when the temperature difference is equal or less than (e.g., at most equal) to the activation point.

At operation 310 in response to the temperature difference obtained at operation 304 being at most equal to the activation point, the processor enters the adaptive thermal management process and adjusts the power limit accordingly. Initially, the processor may decrease the power limit that was set at operation 302 and continue to monitor the die temperature and in turn, the temperature difference. In a further implementation, the processor may continue to obtain new die temperatures so that in response to the new temperature difference being greater than the activation point, the processor will exit the adaptive thermal management process by incrementally increasing the power limit back to the set power limit at operation 302.

FIG. 4 illustrates a flow diagram executable by a processor to adjust a power limit in response to a temperature difference being equal or greater than an activation point. In discussing FIG. 4, references may be made to the components in FIGS. 1-2 to provide contextual examples. In one implementation, processor 102 and 202 executes operations 402-422 to adjust the power limit. In another implementation, a processing resource (not illustrated) executes operations 402-422. Although FIG. 4 is described as implemented by the processor 102 and 202 as in FIGS. 1-2 to adjust the processor power limit, it may be executable on other suitable hardware components. For example, FIG. 4 may be implemented in the form of executable instructions on a machine-readable storage medium executable by processing resources to provide the functionality of operations 402-422.

At operation 402, the processor sets the power limit of the processor power threshold.

In one implementation, the power limit is the power limit as provided in a design-rated specification and/or in relation to a stocking keeping unit (SKU) of the processor. In this manner, the power limit may be dependent on each respective processor. Meaning, the power limit of one processor is different than the power limit of another processor. In another implementation, the processor sets the power limit below the design-rated power limit that may be provided. The power limit is an identified power threshold at which the processor may continue operations, such that if the power limit of the processor reaches above the threshold, the performance of the processor may be affected. In this implementation, the set power limit is the threshold of the processor at which operations of the processor may be throttled. Operation 402 may be similar in functionality to operation 302 as in FIG. 3.

At operations 404-406, the processor sets the temperature activation point. The temperature activation point is set as a value that is between a throttle point and a fan speed control point. As such, the temperature activation point is set to a value that is between zero and the fan speed control point. The temperature activation point provides a baseline measurement to compare temperature differences against to identify if the power limit should be adjusted (e.g., increased or decreased, accordingly). In another implementation, the temperature activation point may be equal to or less than a thermal design point (TDP). The TDP is the point at which the amount of heat generated by the processor that would be generated during operation. Setting the temperature activation point allows the processor to operate within its thermal envelope regardless of the changing workload.

At operation 408, the processor measures the die temperature of at least one associated core. At this step, the processor may continue to take real-time measurement of the die temperature to identify if the processor should enter the adaptive thermal management process to decrease the temperature value while maintaining much functionality of the processor. Based on taking the measurement of the die temperature, the processor proceeds to operation 410 to determine the difference between the real-time die temperature and the throttle temperature as at operation 410.

At operation 410, the processor obtains the difference between the real-time measured die temperature and the throttle temperature. The throttle temperature is considered a temperature value at which the processor would throttle much of operations to decrease the temperature. Obtaining the temperature difference allows the processor to identify how close the die temperature may be reaching the throttling temperature which would decrease performance of the processor and degrade the die. At this operation, the processor may also provide continuous calculations of the differenced based on real-time measurements of the die temperature. Operation 410 may be similar in functionality to operation 304 as in FIG. 3.

At operation 412, the processor compares the temperature difference against the temperature activation point that is set at operation 404. The processor identifies that the temperature difference is at most equal to the temperature activation point. Alternatively, the processor identifies that the temperature is equal to or less than the temperature activation point. Based on the identification that the temperature is at most equal to the temperature activation point, the processor proceeds to decrease the power limit at operation 414. Otherwise, the processor proceeds to continue measuring the die temperature 408 and monitoring the temperature difference to identify the point of time at which the temperature is at most equal to the activation point. Operation 412 may be similar in functionality to operation 306 as in FIG. 3.

Operation 414 in response to the processor determining that the temperature difference is at most equal to the temperature activation point, the processor decreases the power limit. The power limit which is set at operation 402 is decreased in value so that the operational power limit of the processor is reduced. The idea is that a fan may not be adequately cooling the die and as such, decreasing the power limit may bring decrease the temperature.

Operation 416, the processor may obtain a more current die temperature and temperature difference. The processor may proceed to obtain real-time measurements of the die temperature and as such, these real-time measurements may be used to obtain the temperature difference to the throttle temperature. In this manner, the processor may continuously poll for the die temperature and continuously determine the difference.

Operation 418, the processor uses the new temperature difference as at operation 416 and may continue to decrease the power limit at operation 420 or increase the power limit as at operation 422. In this operation, the processor determines when to exit the adaptive thermal management process that includes adjusting the power limit in response to measured die temperatures as at operations 412-416.

Operation 420 in response to the temperature difference not being greater than the activation point (e.g., the temperature difference being less or equal to the activation point), the processor continues to decrease the power limit that may have been initially decreased at operation 414. This indicates the processor is within the process of applying the adaptive thermal management that may have also been initiated at operation 412-414. In response to decreasing the power limit to lower value than at operation 414, the processor may continue to measure the die temperature to calculate a real-time difference between the die temperature and the temperature activation point.

Operation 422 in response to the temperature difference being greater than the activation point, the processor may adjust the power limit by increasing the value of the power limit. In one implementation, the processor incrementally steps the power limit back to the power limit that was set at operation 402. In this implementation, the processor increases the power limit by an incremental value so that the power limit may be adjusted more than once to reach the set power limit as at operation 402. Reaching to the set power limit again means the processor is no longer in the process of the adaptive thermal management and may exit the process.

Figure 5:
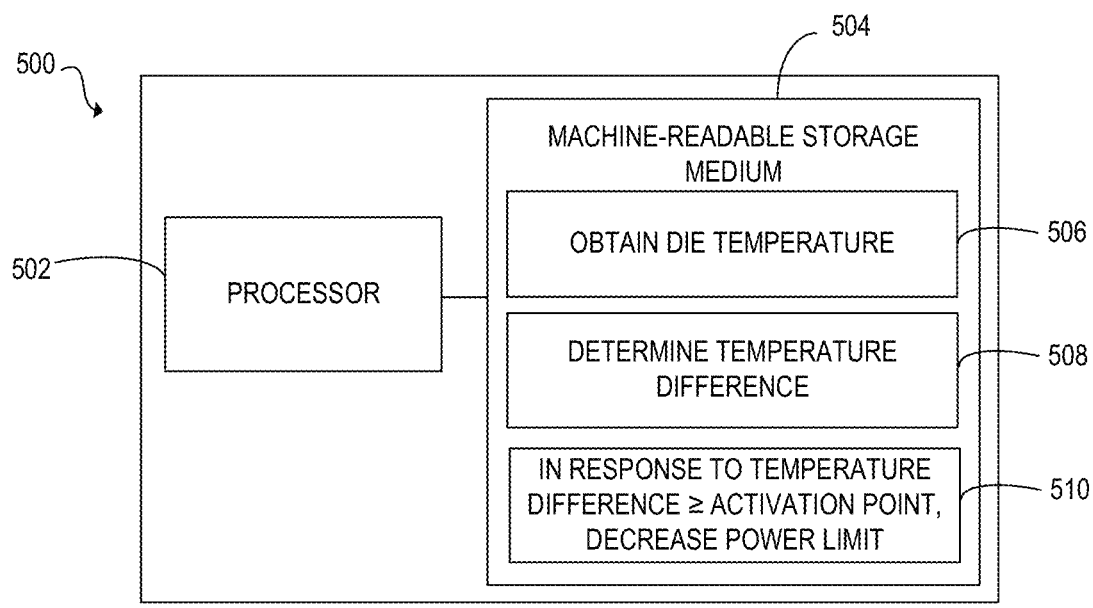
FIG. 5 illustrates a block diagram of an example computing device with a processing resource to execute instructions in a machine-readable storage medium to adjust a power limit in response to a temperature difference being at most equal to a temperature activation point.
Figure 6:
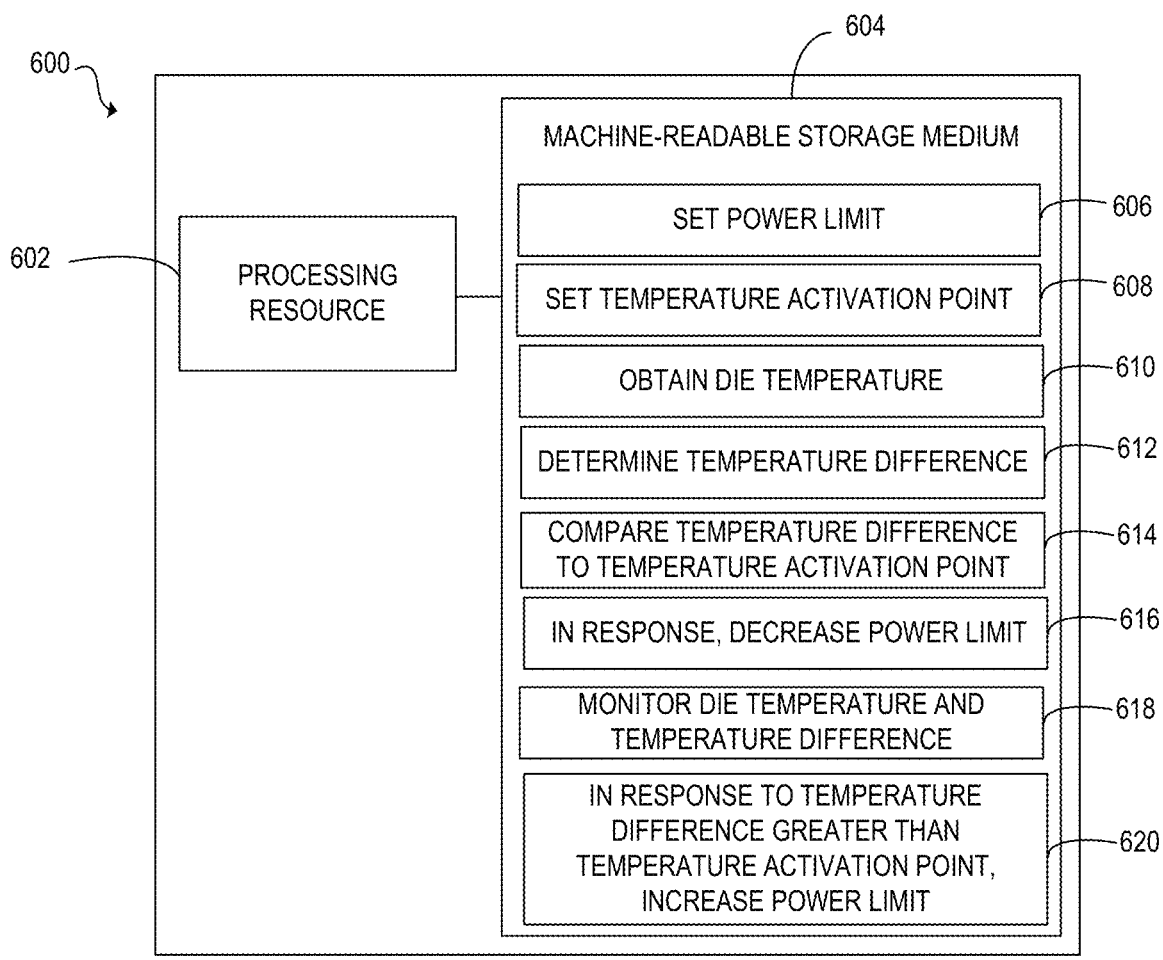
FIG. 6 illustrates a block diagram of an example computing device with a processing resource to execute instructions in a machine-readable storage medium to adjust a power limit in response to a temperature difference being at most equal to a temperature activation point

Referring now to FIGS. 5-6, example block diagrams of computing devices 500 and 600 with processing resources 502 and 602 are illustrated to execute machine-readable instructions in accordance with various examples of the present disclosure. The machine-readable instructions represent instructions that may be fetched, decoded, and/or executed by respective processing resources 502 and 602. While illustrated in a particular order, these instructions are not intended to be so limited. Rather, it is expressly contemplated that various instructions may occur in different orders and/or simultaneously with other instructions than those illustrated in FIGS. 5-6.

FIG. 5 is a block diagram of computing device 500 with processing resource 502 to execute instructions 506-510 within machine-readable storage medium 504. Although computing device 500 includes processing resource 502 and machine-readable storage medium 504, it may also include other components that would be suitable to one skilled in the art. For example, computing device 500 may include a controller, memory storage, or other suitable type of component. The computing device 500 is an electronic device with processing resource 502 capable of executing instructions 506-510 and as such embodiments of the computing device 500 include an electronic device such as a server, switch, router, wireless access point (WAP), or other type of computing device. Other embodiments of the computing device 500 include an electronic device such as a laptop, personal computer, mobile device, or other type of electronic device capable of executing instructions 506-510. The instructions 506-510 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-510 adjust a power limit of the processing resource 502 in response to a temperature difference being equal or less to an activation point. Specifically, the processing resource 502 executes instructions 506-510 to: obtain a die temperature of one of the cores within the processor; determine a temperature difference between the die temperature and a throttle temperature; and in response to the temperature difference being equal or less than an activation point, decrease the power limit the processor.

The machine-readable storage medium 504 includes instructions 506-510 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 504 may include an application and/or firmware which can be utilized independently and/or in conjunction with processing resource 502 to fetch, decode, and/or execute instructions of machine-readable storage medium 504. The application and/or firmware may be stored on machine-readable storage medium 504 and/or stored on another location of computing device 500.

FIG. 6 is a block diagram of computing device 600 with processing resource 602 to execute instructions 606-620 within machine-readable storage medium 604. Although computing device 600 includes processing resource 602 and machine-readable storage medium 604, it may also include other components that would be suitable to one skilled in the art. For example, computing device 600 may include a controller, memory storage, or other suitable type of component. The computing device 600 is an electronic device with processing resource 602 capable of executing instructions 606-620 and as such embodiments of the computing device 600 include an electronic device such as a server, switch, router, wireless access point (WAP), or other type of computing device. Other embodiments of the computing device 600 include an electronic device such as a laptop, personal computer, mobile device, or other type of electronic device capable of executing instructions 606-620. The instructions 606-620 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-620 adjust a power limit of the processing resource 602 in response to a temperature difference being equal or less to an activation point. Specifically, the processing resource 602 executes instructions 606-620 to: set a power limit of the processing resource; set a temperature activation point that indicates whether fan is failing to properly cool the processing resource; obtain a die temperature of one of the cores of the processing resource; determine a temperature difference between the die temperature and a throttle temperature; compare the temperature difference to an activation point; in response that the temperature difference is at most equal to the activation point, decrease the power limit; monitor the die temperature and the temperature difference; and in response to the temperature difference being than the activation point, increase the power limit incrementally back to the set power limit.

The machine-readable storage medium 604 includes instructions 606-620 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 604 may include an application and/or firmware which can be utilized independently and/or in conjunction with processing resource 602 to fetch, decode, and/or execute instructions of machine-readable storage medium 604. The application and/or firmware may be stored on machine-readable storage medium 604 and/or stored on another location of computing device 600.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A method, executable by a processor, the method comprising:
    setting a power limit of the processor;
    in response to operation of a fan, coupled to the processor, at a speed control point, determining a temperature difference between a die temperature of a core within the processor and a throttle point; and
    in response to a determination that the temperature difference is at most equal to a temperature activation point, adjusting the power limit of the processor so that the adjusted power limit is less than the set power limit,
    wherein the temperature activation point is a value between the throttle point and the fan speed control point.

2. The method of claim 1, wherein the die temperature comprises a current value of the die temperature.

3. The method of claim 1, comprising:
    setting the temperature activation point that is closer to the throttle point than the fan speed control point.

4. The method of claim 1, further comprising:
    identifying the die temperature of the core within the processor; and
    monitoring the temperature difference based on the die temperature.

5. The method of claim 1, further comprising:
    monitoring a current value of the die temperature to obtain a new temperature difference following the adjustment of the power limit; and
    in response to the determination that the new temperature difference is greater than the temperature activation point, increasing the power limit.

6. The method of claim 1, wherein in response to the determination that the temperature difference is at most equal to the temperature activation point comprises:
    determining that the temperature difference is equal to the temperature activation point.

7. The method of claim 1, wherein the fan speed control point comprises a fan proportional integral derivative (PID) temperature point.

8. A server system comprising:
    a processor comprising multiple cores, the processor:
        measures a die temperature of at least one of the multiple cores;
        in response to the operation of a fan, coupled to the processor, at a speed control point, determines a temperature difference between the die temperature and a throttle point; and
        in response to a determination that the temperature difference is at most equal to a temperature activation point, decreases a power limit of the processor so that the decreased power limit is less than a design-rated power limit,
wherein the temperature activation point is a value between the throttle point and the fan speed control point.

9. The server system of claim 8, wherein the processor further:
sets the power limit prior to the determination of the temperature difference.

10. The server system of claim 9, wherein the processor further:
monitors a current value of the die temperature to obtain a new temperature difference following the decreased power limit; and
in response to a determination that the new temperature difference is greater than the temperature activation point, increases the power limit.

11. The server system of claim 8, further comprising:
a sensor, coupled to the at least one of the multiple cores of the processor, the sensor:
measures the die temperature of the at least one of the multiple cores; and
provides the die temperature to the processor.

12. A non-transitory machine-readable storage medium comprising instructions that when executed by a processing resource cause a computing device to:
obtain a die temperature of the processing resource;
in response to the operation of a fan, coupled to the processor, at a speed control point, determine a temperature difference between the die temperature and a throttle point; and
in response to a determination that the temperature difference is at most equal to a temperature activation point, decrease a power limit of the processing resource,
wherein the temperature activation point is a value between the throttle point and the fan speed control point.

13. The non-transitory machine-readable storage medium of claim 12, wherein the temperature activation point is closer to the throttle point than the fan speed control point.

14. The non-transitory machine-readable storage medium of claim 12, comprising instructions that when executed by the processing resource causing the computing device to:
set the power limit prior to determination of the temperature difference.

15. The non-transitory machine-readable storage medium of claim 12, comprising instructions that when executed by the processing resource causing the computing device to:
monitor the die temperature following the decreased power limit;
determine whether the temperature difference is greater than the temperature activation point; and
in response to determining that the temperature difference is greater than the temperature activation point, increase the power limit.

16. The non-transitory machine-readable storage medium of claim 12, comprising instructions that when executed by the processing resource causing the computing device to:
continue monitoring the die temperature;
in response to the determination that the temperature difference continues to be at most equal to the temperature activation point, continue to decrease the power limit.

17. The non-transitory machine-readable storage medium of claim 12, wherein instructions to decrease the power limit comprises instructions that when executed by the processing resource cause the computing device to:
based on a determination that the fan is unable to maintain the die temperature below a pre-determined threshold, decrease the power limit.

18. The non-transitory machine-readable storage medium of claim 12, wherein instructions to obtain comprises instructions that when executed by the processing resource cause the computing device to:
measure the die temperature of a core within the processing resource.

* * * * *